May 25, 1926.                                                              1,586,222
H. W. SELLNER
WATER WHEEL AND DIVING PLATFORM
Filed April 30, 1925
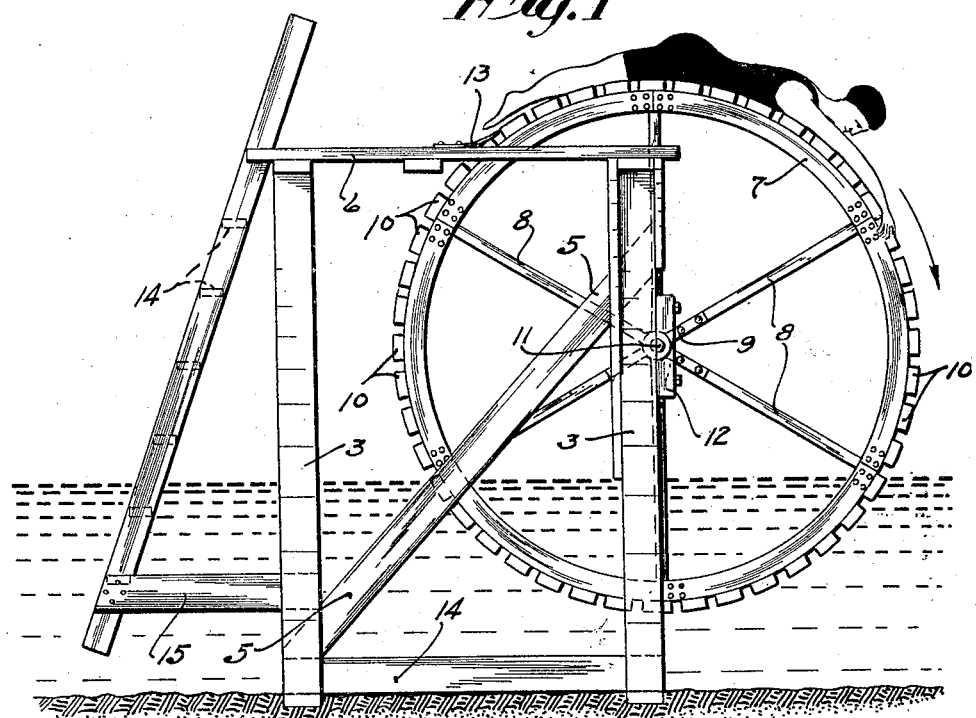
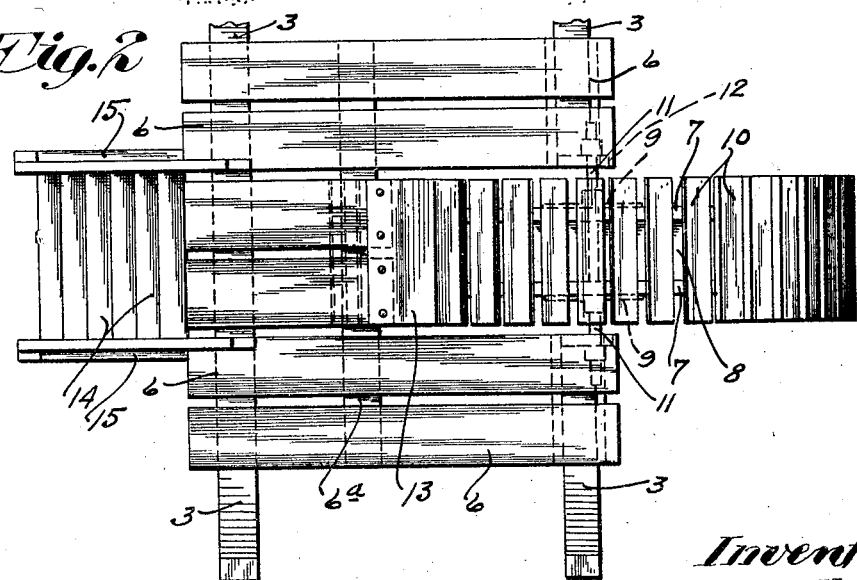
Inventor
Herbert W. Sellner
By his Attorneys Patented May 25, 1926.

1,586,222

UNITED STATES PATENT OFFICE.

HERBERT W. SELLNER, OF FARIBAULT, MINNESOTA.

WATER WHEEL AND DIVING PLATFORM.

Application filed April 30, 1925. Serial No. 27,088.

My invention provides a device for use in lakes and other bathing places for the exercise and amusement of bathers. It comprises a framework partly submerged in the water, a platform above the water and a large rotating wheel journaled to the frame and arranged to rotate with its lower portion immersed in the water and with its upper portion somewhat above the platform. The platform is preferably bifurcated or cut away so that about one-half of that portion of the wheel that is above the horizontal plane of the platform moves through the said platform, and which arrangement keeps the downwardly moving half of the wheel clear from the framework and platform.

The wheel is preferably a wood faced wheel or short drum provided on its periphery with circumferentially spaced cross slats or bars. To prevent backward rotation of the wheel and pinching of the toes or fingers between the wheel and platform, a flexible joint plate is attached to the platform and is yieldingly pressed against the peripheral slats of the wheel.

A ladder, preferably of the step ladder type, is attached to the frame and extended from a point below the water level up to the platform.

In the accompanying drawings, which illustrate the invention, like characters indicate like parts throughout the several views.

Referring to the drawings:—

Fig. 1 is a side elevation showing a complete self-contained device consisting of the framework, platform, wheel and ladder; and Fig. 2 is a plan view of the parts shown in Fig. 1.

The framework may be of any suitable construction, but, as shown, is made up of upright corner posts 3, lower tie beams 4, oblique truss beams 5 and a platform 6. The platform 6 is preferably made up of heavy boards slightly spaced so as to permit water drippage. The water wheel may be of varied construction but as shown is made up of laterally spaced rim bars 7, spokes 8, hub 9 and circumferentially spaced peripheral cross slats or bars 10 that are nailed or otherwise rigidly secured to the rim bars 7. Said parts 7, 8 and 10 are preferably of wood while the hub 9 is preferably of iron, and is secured to a shaft or axle 11 journaled in bearings 12 secured to the adjacent posts 3. By reference particularly to Fig. 2 it will be noted that the platform 6 is bifurcated; that is, a portion thereof is cut away or omitted back to an intermediate cross beam 6$^a$ so that the wheel is located as already described; that is, with its downwardly moving half projected in respect to Fig. 1 to the right of the framework and platform.

A flexible joint plate 13 is preferably of a heavy material such as leather or rubber, bolted, nailed or otherwise secured at one edge to the adjacent ends of the short boards of platform 6. The free upwardly extended edge of this joint strip 13 works frictionally against the cross slats 10 and will engage slightly in the spaces between the cross slats so as to positively prevent backward rotation of the wheel. This joint strip, therefore, prevents the fingers and toes from getting pinched between the wheel and platform; and, moreover, the said joint strip has a slight tendency to slow up rotation of the wheel. However, approximately the one-third (more or less) lower portion of the wheel will run immersed in the water and the water will, of course, slow up or retard rotation of the wheel.

The step ladder 14 at its upper portion is shown as directly secured to the platform 6 and its lower portion is tied to the framework by short horizontal beams 15 so that the entire device comes a self-contained structure capable of being made and erected at the factory and there shipped ready for use.

From what has been said it may be understood that the device described is capable of a large range of modification within the spirit of the invention as herein disclosed and claimed.

The wheel is adapted to be used in quite a number of different ways. In Fig. 1 a person is shown as lying on the upper portion of the wheel ready to make a head first dive into the water on the downward moving side of the wheel. As is evident, however, a person may ride down on the wheel either head first or feet first, or in various different ways. The platform 6 not only serves as an approach to the wheel, but it may be used as an ordinary diving platform.

What I claim is:

1. An amusement device of the kind described comprising a framework adapted to be partly immersed in the water, a platform supported by said frame, and a cylindrical wheel journaled to said frame on a horizontal axis and arranged to run with its lower portion immersed in the water and with its upper portion closely associated with said platform, said wheel projecting beyond said frame on its downwardly moving side.

2. An amusement device of the kind described comprising a framework adapted to be partly immersed in the water, a platform supported by said frame, and a cylindrical wheel journaled to said frame on a horizontal axis and arranged to run with its lower portion immersed in the water and with its upper portion slightly above said platform, said platform being recessed to embrace a portion of said wheel and said wheel projecting beyond said frame on its downwardly moving side.

3. An amusement device of the kind described comprising a framework adapted to be partly immersed in the water, a platform supported by said frame, a cylindrical wheel journaled to said frame on a horizontal axis and arranged to run with its lower portion immersed in the water and with its upper portion slightly above said platform, and a joint plate applied to said platform and frictionally engaging the periphery of said wheel on the upwardly moving side thereof only, said wheel projecting beyond said frame on its downwardly moving side.

4. An amusement device of the kind described comprising a framework adapted to be partly immersed in the water, an elevated platform supported by said frame, a cylindrical wheel journaled to said frame on a horizontal axis with its lower portion arranged to run immersed in the water and with its upper portion working through and slightly above said platform, approximately the downwardly moving half of said wheel being projected and free from said framework, said wheel projecting beyond said frame on its downwardly moving side.

5. An amusement device of the kind described comprising a framework adapted to be partly immersed in the water, an elevated platform supported by said frame, a cylindrical wheel journaled to said frame on a horizontal axis with its lower portion arranged to run immersed in the water and with its upper portion working through and slightly above said platform, approximately the downwardly moving half of said wheel being projected and free from said framework, the peripheral portion of said wheel being formed by circumferentially spaced cross slats, said wheel projecting beyond said frame on its downwardly moving side.

6. An amusement device of the kind described comprising a framework adapted to be partly immersed in the water, an elevated platform supported by said frame, a cylindrical wheel journaled to said frame on a horizontal axis with its lower portion arranged to run immersed in the water and with its upper portion working through and slightly above said platform, approximately the downwardly moving half of said wheel being projected and free from said framework, the peripheral portion of said wheel being formed by circumferentially spaced cross slats, and a flexible joint strip attached to said platform with its free edge working frictionally against the cross slats of said wheel and preventing backward rotation thereof, said wheel projecting beyond said frame on its downwardly moving side.

7. The structure defined in claim 1 in further combination with a ratchet-acting device operative on said wheel to permit rotation thereof in a direction to move downwardly on that side that projects beyond said frame, but to prevent reverse or backward rotation.

8. The structure defined in claim 1 in which said wheel has circumferentially spaced transverse peripheral slats, and in further combination with a ratchet-acting device operative on said slats to permit rotation thereof in a direction to move downwardly on that side that projects beyond said frame, but to prevent reverse or backward rotation.

In testimony whereof I affix my signature.

HERBERT W. SELLNER.